Dec. 23, 1941.   F. STEBLER   2,267,428
WATER ELIMINATOR
Filed Jan. 9, 1939   3 Sheets-Sheet 1

INVENTOR
FRED STEBLER
BY
ATTORNEY

Dec. 23, 1941.  F. STEBLER  2,267,428
WATER ELIMINATOR
Filed Jan. 9, 1939  3 Sheets-Sheet 2
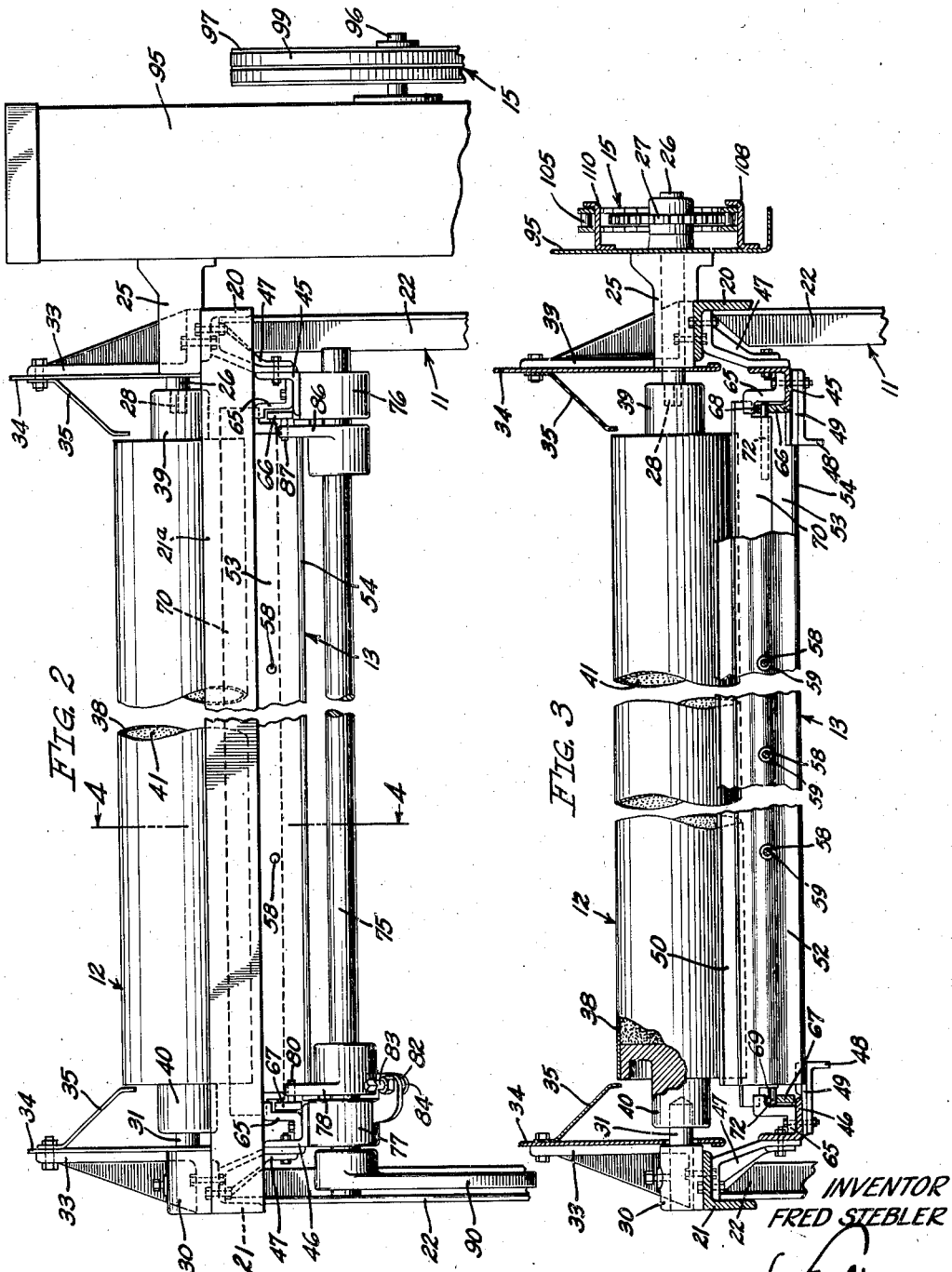
INVENTOR
FRED STEBLER
BY
ATTORNEY

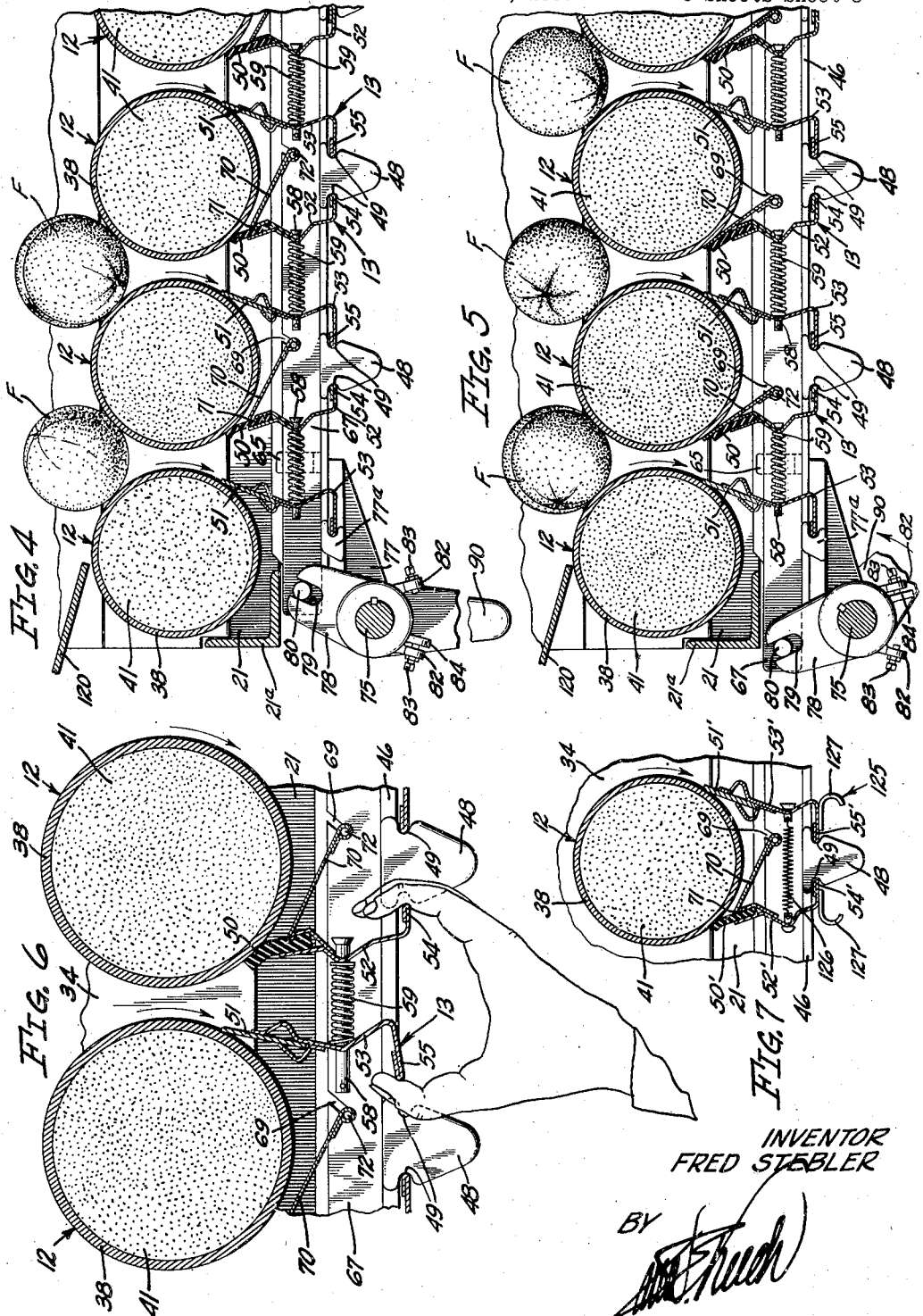

Patented Dec. 23, 1941

2,267,428

UNITED STATES PATENT OFFICE 2,267,428

WATER ELIMINATOR

Fred Stebler, Riverside, Calif., assignor to Food Machinery Corporation, San Jose, Calif., a corporation of Delaware Application January 9, 1939, Serial No. 249,858

14 Claims. (Cl. 34—85)

My invention relates to machines for treating rollable articles such as rollable fruits and the like and is particularly useful in conditioning the fruit treating surfaces of water eliminating machines such as shown in United States Patent No. 1,974,128 issued September 18, 1934, to Albert R. Thompson, and United States Patent No. 1,957,964 issued May 8, 1934, to Lloyd E. Jones.

Prior to packing fruit and other agricultural products for shipment, the fruit is first washed to remove dirt, residue of insecticides, etc., from the surface thereof and then thoroughly dried before being polished, separated into various grades and sizes and packed. The procedure commonly followed in the citrus industry, for example, is shown in the above mentioned Jones patent. In each of the patents referred to, the fruit passes from a washer into a water eliminator to remove most of the water from the fruit in order to facilitate the final drying of the fruit in the dryer. The water eliminators shown in the Thompson and Jones patents include a plurality of smooth, non-absorbent rolls which collect water from the moisture-repellent surfaces of the fruit, the moisture being then removed from the rolls by squeegees.

Although water eliminators of this type have proven generally satisfactory, several deficiences have become apparent after the machines have been in use for a period of time. One of these faults is a loss in efficiency of the squeegees due to the accumulation of foreign material on the wiping surfaces thereof. A certain amount of gummy, oily material and dirt escapes removal from the fruit during the washing process and is thereby deposited on the rolls of the eliminator. Some of this material becomes deposited on the rolls, and consequently accumulates on the squeegees causing the latter to become fouled and lessens their efficiency to remove moisture from the rolls. It is also obvious that the efficiency of the water eliminator is greatly reduced by such particles of foreign material which may gradually collect on the surfaces of the rolls. The material comprising such particles is often water-repellent and consequently reduces the ability of the rolls to attract water from the surfaces of the fruit.

Another problem encountered in eliminators of this type is that the squeegees are not readily removable from the machine and considerable time is required to remove them as for inspection, cleaning and replacement. It is sometimes necessary to remove the squeegees from the last few rolls of the eliminator when, due to extremely dry atmospheric conditions, the excess water is completely removed from the fruit before the latter passes entirely through the eliminator. If the squeegees are allowed to rub on relatively dry rolls, excessive wear occurs on the squeegees and considerably more power is required to drive the rolls. It is thus very desirable to be able to readily remove as many of the squeegees as necessary and to do so without stopping the machine and interrupting the passage of fruit therethrough.

It is an object of my invention to provide a machine for conveying and treating rollable objects on rollers embodying improved means for maintaining the surfaces of said rollers in proper condition for conveying and/or treating the objects resting thereon.

It is a further object of my invention to provide such a machine in which squeegees are used for removing liquid from the surface of the rolls and embodying means for maintaining said squeegees in proper adjustment and condition for performing their function.

It is yet another object of my invention to provide such a machine in which squeegees are used for wiping the rollers, and embodying means whereby said squeegees may be periodically cleaned without removing said squeegees from the machine.

Yet another object of my invention is to provide a machine as aforesaid embodying means for conditioning the surfaces of the rollers thereof which means is adapted for ready removal from the machine or replacement therein.

Other objects and advantages will become apparent in the following description taken in connection with the accompanying drawings, in which Fig. 1 is a side elevational view of a preferred embodiment of the machine of my invention, side portions thereof being broken away to show certain details thereof.

Fig. 2 is an enlarged, fragmentary, end elevational view looking in the direction of the arrow 2—2 of Fig. 1.

Fig. 3 is an enlarged, transverse sectional view taken on the line 3—3 of Fig. 1.

Fig. 4 is a fragmentary, vertical sectional view taken on the line 4—4 of Fig. 2.

Fig. 5 is a view similar to Fig. 4 but showing the operation of the squeegee cleaning members.

Fig. 6 is an enlarged, fragmentary view showing the manner in which one of the roll-conditioning units of my invention is removed from or installed in the machine.

Fig. 7 is a fragmentary view showing a modified form of apparatus of my invention.

Figure 1:
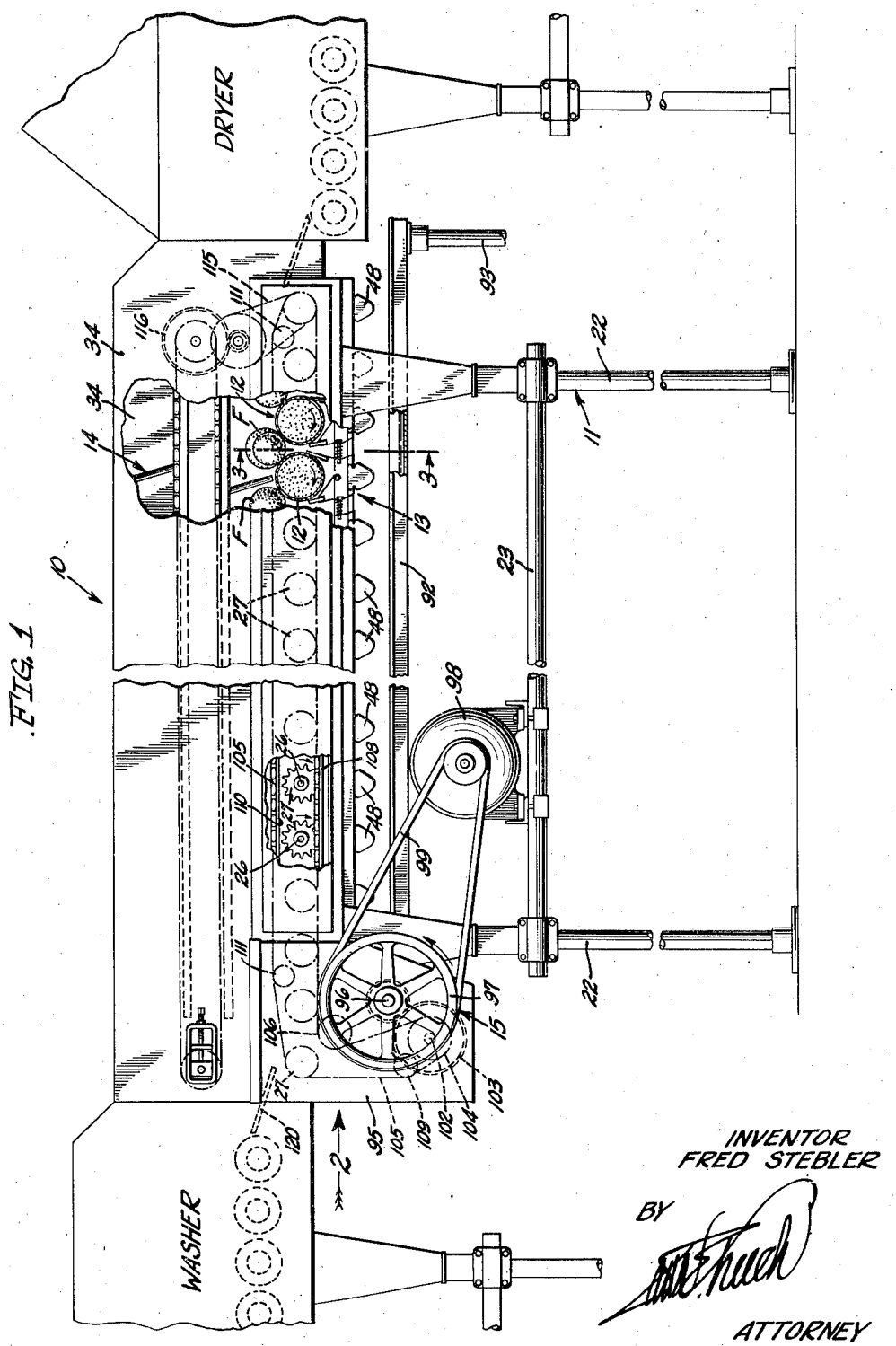

Referring specifically to the drawings, a water eliminator 10, comprising a preferred embodiment of my invention, is shown in Fig. 1. The machine 10 includes a frame 11, water-collecting rolls 12, roll-conditioning units 13, a fruit cleanout mechanism 14 and suitable power transmitting mechanism 15.

The frame 11 includes longitudinal angle irons 20 and 21 supported by legs 22 as shown in Fig. 3. Extending transversely at each end of the machine 10 between the angle irons 20 and 21 are cross members 21a, one of the latter being shown in Figs. 2 and 4. The legs 22 are braced by longitudinal pipes 23, one of the latter being shown in Fig. 1. Mounted on the angle iron 20 at equally spaced intervals are bearings 25 in which driven shafts 26 are mounted, the latter having sprockets 27 fixed on outer ends thereof and being squared on their inner ends as indicated at 28.

Mounted on the angle iron 21 in alignment with the bearings 25 are bearings 30 in which studs 31 are fixed. Extending upward from the angle irons 20 and 21 are brackets 33 to which side plates 34 and fruit guard rails 35 are fixed.

Each of the water-collecting rolls 12 includes a cylinder 38, preferably made of non-corrosive metal such as brass or galvanized iron and having heads 39 and 40 secured at opposite ends thereof, the head 39 being recessed for engagement with the squared end 28 of shaft 26 while the head 40 is bored to receive the innermost end of the stud 31. The rolls 12 are preferably filled with sawdust 41 or similar vibration-absorbing material to deaden the sound created by the frictional contact of the rolls 12 and the roll-conditioning units 13.

The roll-conditioning units 13 are mounted on a suitable frame which includes a pair of longitudinal angle iron members 45 and 46 suspended below the angle irons 20 and 21 by brackets 47 as shown in Fig. 3. Bolted to the angle iron members 45 and 46 below each of the rolls 12 are members 48 having opposed recesses 49 for supporting the roll conditioning units 13 as seen in Figs. 3 and 4. Each of the units 13 includes a rubber squeegee 50 and a scraper 51, as shown in Fig. 4. The squeegees 50 and scrapers 51 are supported by holders 52 and 53 respectively, the latter having horizontally disposed flanges 54 and 55 respectively for engagement with the recesses 49 of the supporting members 48. Received by aligned holes in the holders 52 and 53 are pins 58 having compression springs 59 thereon. As shown in Fig. 4, the springs 59 urge the scrapers 51 and squeegees 50 against the rolls 12 and also urge the holders 52 and 53 into assembled relation with the supporting members 48.

Mounted on top of the angle irons 45 and 46, as shown in Fig. 3, are guides 65 against which slidable bars 66 and 67 are positioned. The bar 66 is provided with equally spaced holes 68, the bar 67 having diagonal slots 69 positioned opposite the holes 68 of the bar 66. Mounted between the bars 66 and 67 are squeegee cleaning members 70 each of which has a sharp scraping edge 71 and a pair of trunnions 72, the latter being received by the holes 68 of bar 66 and the slots 69 of bar 67 as shown in Fig. 3. The members 70 are preferably formed of sheet metal and are coextensive in length with the squeegees 50, which are also coextensive in length with the liquid collecting rolls 12.

For the purpose of operating the squeegee cleaning members 70, a shaft 75 is mounted at one end of the machine 10 in suitable bearings 76 and 77 as shown in Fig. 2. As seen in Fig. 4, lugs 77a are provided on the bearings 76 and 77 for supporting one side of the first one of the roll-conditioning units 13. Fixed on the shaft 75 adjacent the bearing 77 is a lever 78 formed to provide a slot 79, the latter receiving a pin 80 on the end of the bar 67. To limit the movement of the shaft 75, a pair of ears 82 is formed on the bearing 77, these ears having set screws 83 for engagement with a lug 84 formed on the lever 78. Fixed on the shaft 75 adjacent the bearing 76 is a lever 86 engaging a pin 87 on the bar 66, in the same manner as the lever 78 engages the pin 80 of the bar 67. The shaft 75 is manually rotated by means of a lever 90. Supported by the frame 11 below the roll-conditioning units 13 is a pan 92 for receiving the water removed from the rolls 12 by the squeegees 50, the pan 92 being drained by a suitable pipe 93 as shown in Fig. 1.

The cleanout mechanism 14, shown in Fig. 1, is generally similar to the cleanout disclosed in United States Patent No. 1,946,023 issued February 6, 1934, to Lloyd E. Jones, and is provided in the machine 10 for the purpose of removing residual fruit from the machine when the feeding of fruit to the machine is stopped.

The power transmitting mechanism 15 includes a housing 95 mounted on the bearings 25 as shown in Fig. 2. The housing 95 is coextensive with the machine 10 and is enlarged at one end thereof as shown in Fig. 1. Journalled in the housing 95 is a shaft 96 having a pulley 97 fixed thereon, the latter being driven by a motor 98 through a belt 99. Also journalled in the housing 95 is a counter-shaft 102 driven from shaft 96 by suitable gearing 103. Fixed on the shaft 102 is a sprocket 104 about which a chain 105 is trained. The lower flight of the chain 105 extends over an idle sprocket 106 and is supported in mesh with the lower sides of the sprockets 27 by a track 108. The upper flight of the chain 105 engages an idle sprocket 109, the first one of the sprockets 27 and is supported out of mesh with all except the first one of the sprockets 27 by a track 110 and idle sprockets 111. All of the rolls 12, except the first one thereof, are driven clockwise as viewed in Fig. 1 by the lower flight of the chain 105. The cleanout mechanism 14 is driven from the last of the rolls 12 by a suitable chain 115 and gearing 116.

Operation

In practice, the water eliminator 10 of my invention is positioned between a fruit washer and a dryer or other apparatus as shown in Fig. 1. After passing through the washer, wet fruit F is delivered to the receiving end of the water eliminator 10 by a suitable drop board 120. The fruit tends to remain in the valleys formed between adjacent rollers 12 of the eliminator 10 until being displaced therefrom by the cleanout 14 or by additional oncoming fruit. Rotation of the rolls 12 causes each piece of fruit to rotate so that the entire surface thereof is subjected to contact with the rolls 12. While the wet surfaces of the fruit are in contact with the rolls 12, surface moisture is transferred from the fruit to the rolls 12 due to the water-repellent nature of the oily fruit surfaces and the water-adherent nature of the roll surfaces when maintained in proper condition. As the rolls 12 rotate in the direction indicated by the arrows in Fig. 4, the scrapers 51 serve to remove some of the water from the roll surfaces as well as any solid material that might be deposited on the rolls from the fruit. The squeegees 50 remove substantially all of the water remaining on the roll surfaces so as to continuously maintain the roll surfaces in proper condition for removing water from the fruit.

After the machine 10 has been in operation for some time, the efficiency of the squeegees 50 declines due to accumulation of foreign particles thereon which escape removal from the rolls by the scrapers 51. If these particles are not removed from time to time from the squeegees, the latter eventually become glazed and ineffective. In the machines disclosed in the patents above referred to, the squeegees are often neglected due to the fact that considerable time and labor is required to perform the cleaning operation. In the machine 10 of my invention, the squeegee cleaning members 70 can be very easily actuated without stopping the machine or interrupting the flow of fruit therethrough. This cleaning operation is performed manually by simply moving the lever 90 from the position in which it is shown in Fig. 4 to that shown in Fig. 5. This rotates the shaft 75 counter-clockwise as viewed in Fig. 5 causing the levers 86 and 78 to slide the bars 66 and 67 leftward. As the bars 66 and 67 move simultaneously, the cleaning members 70 are forced between the squeegees 50 and rolls 12 as shown in Fig. 5. The relatively sharp edges 71 of the members 70 scrape the foreign particles from the squeegees 50 thus preventing the latter from becoming glazed and ineffective. The members 70 may be actuated in this manner as many successive times as necessary to thoroughly clean the squeegees 50 by simply oscillating the lever 90, the latter being returned to the position in which it is shown in Fig. 4 upon completion of the squeegee cleaning operation to return the cleaning members 70 to inoperative position. It is to be thus noted that the cleaning members 70 may be actuated without stopping the machine or interfering with the passage of fruit therethrough. In fact, it is desirable to clean the squeegees while the machine 10 is operating as the rotation of the rolls 12 facilitates insertion of the cleaning members 70 between the squeegees 50 and rolls 12. Rotation of the rolls 12 also prevents scratching or cutting of the rolls by the members 70 if the latter are inserted at a rate of speed less than the surface speed of the rolls 12.

After water eliminators of this type have been standing idle for a considerable length of time, the squeegees often stick fast to the rolls and prevent the machine from starting due to the excessive amount of surface resistance offered by the frozen squeegees. If the machine should have sufficient power to start, regardless of this condition, portions of the squeegees are apt to be torn loose and remain on the surfaces of the rolls, or the squeegees pulled out of their holders, thus greatly reducing the efficiency of both the squeegees and rolls. As there are usually about 24 rolls in such a machine, the task of manually breaking the squeegees loose, one-by-one, requires considerable time and effort. In the machine 10 of my invention, the squeegees are very easily loosened from the rolls by simply actuating the cleaning members 70 by means of the single lever 90 as aforedescribed.

When it becomes necessary to remove any of the roll-conditioning units 13 from the machine 10, the operator grasps the flanges 54 and 55 as shown in Fig. 6 and exerts sufficient pressure to compress the springs 59 so as to withdraw the flanges 54 and 55 from the recesses 49 of the members 48. This operation completely frees the unit 13 for removal from the machine 10 and can be accomplished without stopping the machine. The units 13 are reinstalled in the machine by simply reversing the process employed in removing the unit.

Referring now to Fig. 7 of the drawings, I have shown therein a modified form of roll-conditioning unit 125. Similar parts in each of the roll-conditioning units 13 and 125 are indicated by similar reference numerals with the prime added to the numerals used to denote parts in the modification 125. The unit 125 is substantially similar to the aforedescribed units 13 with the exception that a tension spring 126 positioned directly below each of the rolls 12 is substituted for the compression spring 59 used between adjacent rolls 12 in the units 13. Fixed on the lower sides of the squeegee and scraper holders 52' and 53' are hooks 127 provided to facilitate removal of the unit 125 from engagement with the recesses 49 of the member 48. To remove the unit 125 from the machine 10, the operator grasps the hooks 127 and expands the unit 125 against the tension of the spring 126 until the flanges 54' and 55' are free from the recesses 49 of the member 48, thus permitting removal of the unit 125.

It is thus seen that the machine 10 may be very quickly and easily maintained in efficient working condition with a minimum of time and effort and that the tendency of operators to neglect maintaining such machines in good working order is greatly reduced by my invention due to the ease with which the machine 10 may be serviced.

Although I have shown and described but one preferred and one modified form of the apparatus of my invention, it is to be understood that various changes and modifications might be made therein without departing from the spirit of the invention or the scope of the appended claims.

I claim as my invention:

1. In a machine for treating fresh, whole fruit, the combination of: means forming a fruit treating surface; means for conveying fruit along said surface in rollable contact therewith; a pair of members for conditioning said treating surface, one of said pair being positioned in wiping relation with said treating surface and the other of said pair in scraping relation therewith; means for supporting said members in said wiping and scraping relation with said treating surface; power means causing relative movement between said pair of members and said treating surface; and yieldable means disposed to retain said pair of members in assembled relation with said supporting means.

2. In a machine for treating fresh, whole fruit, the combination of: means forming a fruit treating surface; means for conveying fruit along said surface in rollable contact therewith; a wiping member supported in wiping relation with said treating surface; power means causing relative movement between said treating surface and said wiping member; a cleaning member; means for movably mounting said cleaning member in said machine adjacent said wiping member; and means for shifting said cleaning member to insert the same between said wiping member and said treating surface to clean the wiping surface of said wiping member.

3. In a machine for removing moisture from the exterior surface of fresh, whole fruit, the combination of: means forming a fruit supporting surface; means for conveying fruit along said surface in rollable contact therewith, moisture from the repellent surfaces of said fruit being transferred to said fruit supporting surface; a squeegee mounted in said machine for removing moisture from said supporting surface; power means causing relative movement between said supporting surface and said squeegee; a cleaning member; means for movably mounting said cleaning member on said machine for movement along a path which will insert said cleaning member between said squeegee and said supporting surface to clean the wiping surface of said squeegee; and means to so move said cleaning member.

4. In a machine for removing moisture from the exterior surface of fresh, whole fruit, the combination of: means forming a fruit supporting surface; means for conveying fruit along said surface in rollable contact therewith, moisture from the repellent surfaces of said fruit being transferred to said fruit supporting surface; a squeegee contacting said supporting surface for removing moisture therefrom; means for supporting said squeegee in said contacting relation with said surface; yieldable means retaining said squeegee in assembled relation with said supporting means; a squeegee cleaning member mounted in said machine adjacent said squeegee; and means for inserting said cleaning member between said squeegee and said fruit supporting surface to clean the wiping surface of said squeegee.

5. In a machine for treating fresh, whole fruit, the combination of: means forming a fruit treating surface; means for conveying fruit along said surface in rollable contact therewith; a removable unit including a wiping member and a scraping member for conditioning said treating surface; means for supporting said unit with said wiping and scraping members contacting said treating surface; yieldable means for retaining said unit in assembled relation with said supporting means; and power means causing relative movement between said treating surface and said wiping and scraping members.

6. In a machine for treating fresh, whole fruit, the combination of: means forming a fruit treating surface; means for conveying fruit along said surface in rollable contact therewith; a removable unit including a wiping member and a scraping member for conditioning said treating surface; means for supporting said unit with said wiping and scraping members contacting said treating surface; yieldable means for retaining said unit in assembled relation with said supporting means; a cleaning member mounted on said machine adjacent said wiping member; means mounted on said machine for inserting said cleaning member between said wiping member and said treating surface to clean the wiping surface of said wiping member; and power means causing relative movement between said treating surface and said wiping and scraping members.

7. In a machine for treating rollable bodies, the combination of: a power driven element having an endless treating surface; means for supporting said bodies in rollable contact with said treating surface; a wiping member; means for supporting said wiping member in contact with said treating surface; a cleaning member movably mounted on said machine adjacent said wiping member; and manually operable means mounted on said member for inserting said cleaning member between said wiping member and said treating surface to clean the wiping surface of said wiping member.

8. In a machine for removing moisture from the surface of fresh, whole fruit, the combination of: a revoluble element; means for supporting fruit in rolling contact with said element to permit transfer of moisture from the repellant surfaces of said fruit to said element; a squeegee mounted in wiping relation with said element to remove moisture therefrom; a cleaning member movably mounted on said machine adjacent said squeegee; and means mounted on said machine for moving said cleaning member across the wiping surface of said squeegee to clean said surface.

9. In a machine for removing moisture from the surface of fresh, whole fruit, the combination of: a revoluble element; means for supporting fruit in rolling contact with said element to permit transfer of moisture from the repellant surfaces of said fruit to said element; a squeegee for removing moisture from said element; means for removably supporting said squeegee in wiping contact with said element; yieldable means for urging said squeegee into assembled relation with said supporting member; a cleaning member mounted adjacent said squeegee; and means mounted on said machine for moving said cleaning member across the wiping surface of said squeegee to clean said surface.

10. In a machine for removing moisture from the surfaces of fresh, whole fruit, the combination of: a plurality of rotatable rolls mounted side-by-side for supporting fruit in the valleys therebetween, moisture from the surfaces of said fruit being transferred to the surfaces of said rolls during the rolling contact of said fruit against said rolls; a roll-conditioning unit positioned between each adjacent pair of rolls out of the path of said fruit; means on each such conditioning unit for removing moisture from one of the pair of rolls adjacent thereto; means for removing solid material from the other of said adjacent rolls; means for removably supporting said conditioning unit in operative relation with said adjacent rolls; and yieldable means for retaining said unit in assembled relation with said supporting means.

11. In a machine for removing moisture from the surfaces of fresh, whole fruit, the combination of: a plurality of rotatable rolls mounted side-by-side for supporting fruit in the valleys therebetween, moisture from the surfaces of said fruit being transferred to the surfaces of said rolls during the rolling contact of said fruit against said rolls; a roll-conditioning unit positioned between each adjacent pair of rolls out of the path of said fruit; means on each such conditioning unit for removing moisture from one of the pair of rolls adjacent thereto; means for removing solid material from the other of said adjacent rolls; a cleaning member for cleaning said wiping member in each of said units; and means for moving said cleaning members across the wiping surfaces of said wiping members.

12. In a machine for removing moisture from the surfaces of fresh, whole fruit, the combination of: a plurality of rotatable rolls mounted side-by-side for supporting fruit in the valleys therebetween, moisture from the surfaces of said fruit being transferred to the surfaces of said rolls during the rolling contact of said fruit against said rolls; a removable roll-conditioning unit positioned adjacent each of said rolls, said unit including means for removing moisture from said roll and means for scraping solid material from said roll; means for supporting said unit in operative engagement with said roll and yieldable means for urging said unit into assembled relation with said supporting means.

13. In a machine for removing moisture from the surfaces of fresh, whole fruit, the combination of: a plurality of revoluble rolls mounted side-by-side for supporting fruit thereupon, moisture from the surfaces of said fruit being transferred to the surfaces of said rolls during rolling contact between said fruit and said rolls; a squeegee mounted adjacent each of said rolls for removing moisture from the latter; a cleaning member mounted adjacent each of said squeegees; and means for simultaneously moving said cleaning members across the wiping surfaces of said squeegees to remove foreign material collected by said squeegees from said rolls.

14. In a machine for removing moisture from the surfaces of fresh, whole fruit, the combination of: a plurality of revoluble rolls mounted side-by-side for supporting fruit thereupon, moisture from the surfaces of said fruit being transferred to the surfaces of said rolls during rolling contact between said fruit and said rolls; a squeegee mounted adjacent each of said rolls for removing moisture from the latter; a cleaning member mounted adjacent each of said squeegees; and manually operable control means for simultaneously moving all of said cleaning members across the wiping surfaces of said squeegees to remove foreign material collected by said squeegees from said rolls.

FRED STEBLER.